Sept. 7, 1954   R. MacHENRY   2,688,380
FILTER CARTRIDGE
Filed July 13, 1951
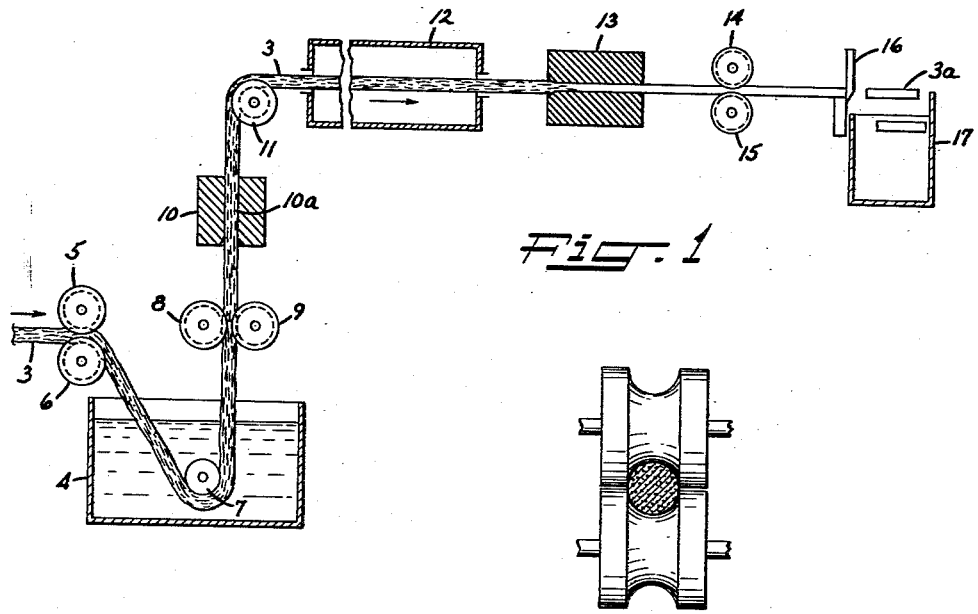
Fig. 1
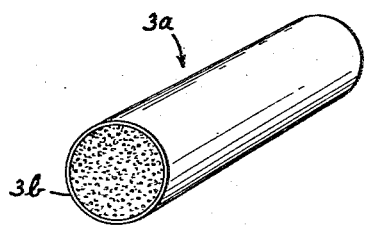
Fig. 2
Fig. 3
Fig. 6
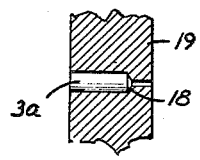
Fig. 4
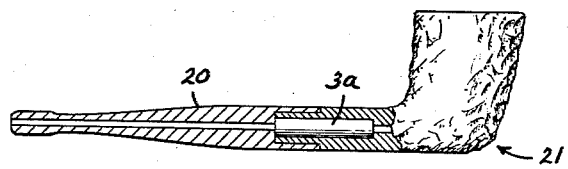
Fig. 5
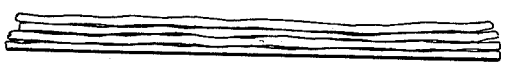
Fig. 7
INVENTOR.
RICHARD MacHENRY
BY
ATTORNEY.

Patented Sept. 7, 1954

2,688,380

UNITED STATES PATENT OFFICE 2,688,380

FILTER CARTRIDGE

Richard MacHenry, Prospect Park, Pa., assignor to American Viscose Corporation, Wilmington, Del., a corporation of Delaware Application July 13, 1951, Serial No. 236,620

1 Claim. (Cl. 183—44)

This invention relates in general to filter cartridges. More particularly, the invention relates to filter cartridges which are constructed substantially or entirely from thermoplastic synthetic filaments, fibers, yarns, threads, and the like.

In the process of filtering various fluids, and the like, the choice of a filter medium depends largely upon the material to be filtered and the liquid or fluid in which it is suspended. A satisfactory filter medium must be of good mechanical strength, resiliency and resistance to deterioration under the conditions of use. Further, the filter medium must be substantially impervious to the suspended matter, or material to be filtered out, while at the same time permitting the fluid to pass through quite easily.

Various and sundry types of filters made from a variety of materials are well known, for example, textile fibers, asbestos, metal, silex, glass, stone ware, etc., or mixtures of certain of these. Filters made from fibrous materials, such as cotton and wool, are widely used. However, alkalies and strong acids destroy both wool and cotton. Therefore, cotton and wool are not suitable for filtering such materials and resort must be had to some other material. Special metal cloths have been made but the fabrication of fine metal screens is difficult and exceedingly costly.

Fibrous filter media have proved to be impractical in many instances, particularly where it is necessary to continually filter, over long periods of time, fluids containing appreciable solid contents, because it has proved impractical to design the filter media with respect to rigidity, density, porosity, and permeability. This is probably due to the fact that in most filters of a fibrous nature, the fibers are scattered promiscuously through the body of the medium, lying in all directions, tangled, twined and interlaced one with the other indiscriminately. Efforts to arrange the fibers in some sort of organized manner or pattern, such as in substantially parallel relationship, have not proved too successful. Employing continuous filaments or yarns and arranging them substantially parallel in the form of a filter cartridge has likewise proven impractical since an adhesive material of some kind must be employed to hold the filaments in such relationship and in addition, a casing or protective sheath must be employed around the bundle or group of filaments. In such instances, the adhesive would necessarily have to be one not attacked chemically or otherwise by the filtrate or fluid passing therethrough. Further, the complexity of manufacture and the cost thereof, in making such a filter cartridge, is excessive and therefore such filter cartridges have not found practical or wide use in the art.

It has been found to be desirable, in the case of filter elements or cartridges, to have the fibers or filaments in substantially parallel relation with substantially all of the fibers in longitudinal contact with each other. This arrangement provides a multiplicity of substantially uniform spaces between the fibers or filaments that form filtrate passages extending lengthwise of the fibers or filaments at opposite sides of the lines of longitudinal contact thereof.

This invention overcomes the aforementioned difficulties and disadvantages of prior filter cartridges and provides one made of filaments which are resistant to alkalies and strong acids and many other materials which normally make the well-known filter cartridges unsuitable for use. This invention provides a filter cartrides in which the filaments are arranged in substantially parallel relation and are formed from a synthetic material such as a thermoplastic resin. Various other objects and advantages of the present invention will be apparent from the following description thereof.

While the present invention contemplates the use of any resinuous material in the form of continuous filaments which are thermoplastic, it is preferred to use fibers or filaments formed from Vinyon, i. e., a copolymer of vinyl chloride and vinyl acetate. As an example of a suitable Vinyon, there may be mentioned one containing 85% vinyl chloride and 15% vinyl acetate. A sliver or a bundle of parallelized Vinyon filaments is passed through a heated water bath wherein the fibers are rendered slightly adhesive and in addition are allowed to shrink, and then passed through a suitable die to form the bundle of filaments into the desired cross-section, and then the filaments or bundle of filaments are passed through a drier. The filaments, having become slightly adhesive due to passing through the heated water bath, are bonded together by coalescence to one another at numerous points along their length, i. e., longitudinally, upon passing through the die. The fibers are not bonded together along their entire length because they are not strictly parallel and various points or portions along the length of the fibers or filaments are subjected to greater pressure than other points. The bonds are formed at the points of greater pressure. Upon leaving the drier, the bundle of filaments is passed through one or more heated compression dies which compact the bundle or filaments to the desired pore size and in addition the dies are heated to a temperature sufficient to coalesce the fibers on the periphery of the bundle and thus form a smooth sheath about the bundle. It is this latter step which is of extreme importance in the present invention since heretofore in employing a bundle of parallel fibers or filaments, it has been necessary to apply a separate sheath about such bundle in order to maintain the fibers in such relationship. In addition, the sheath, formed in the manner above described in the present invention, makes the cartridge or filament bundle more rigid and suitable for use in many instances where it would not be capable of use were it not for such rigidity.

While Vinyon filaments and fibers are preferred in the present invention, various other thermoplastic synthetic materials may be employed such as polymers formed from various organic compounds such as cumarone, indene hydrocarbons, styrene, thermosetting resin-forming precondensates in the thermoplastic state, such as urea-aldehyde resin-forming condensates, phenol-aldehyde resin-forming condensates, amine aldehyde resin-forming condensates, resins formed from methyl methacrylate, as well as polymerized butadiene, chlorinated rubber, and in addition copolymers of vinyl halide and vinyl acetate, copolymers of vinyl halide and acrylic acid, copolymers of a vinyl compound and a styrol compound, and also filaments and fibers formed from mixtures of such resins, and the like.

In order to more clearly understand the following detailed description of the present invention, reference should be had to the accompanying drawing which is merely intended to be illustrative and not limitative, and in which Figure 1 is a diagrammatic view showing the various stages in the preparation of the filter cartridge of the present invention and the apparatus therefor;

Figure 2 is an enlarged elevation view of a pair of grooved draw rollers or die rollers suitable in the practice of the present invention;

Figure 3 is a perspective view of a filter cartridge;

Figure 4 is a sectional view showing a filter cartridge produced in accordance with the present invention as the same may be employed in the ram head of an ordinary filter press;

Figure 5 is a pictorial view partly in section, showing a filter cartridge of the present invention employed in the stem of a smoking pipe;

Fig. 6 is an enlarged fragmentary view of the end of the filter shown in Fig. 3; and Fig. 7 is an enlarged fragmentary longitudinal section of the structure of Fig. 3 showing the random coalescence of the fibers of the filter element.

Referring in particular to Figures 1 and 2 of the drawing, a sliver 3 of Vinyon fibers is fed into a bath 4, which contains heated or unheated water, by means of the grooved feed rollers 5 and 6. The sliver passes under the guide roll 7 submerged in the water in bath 4 and then passes upwardly out of the bath between the grooved drawing rollers 8 and 9 and then through the unheated die 10 where the sliver is shaped as desired. It is to be understood that while it is preferred to produce the filter cartridges in the form of a rod, this rod may have a cylindrical, square, or any other desired cross-sectional shape. The shape of the opening 10a in the die 10 may correspond to the cross-sectional shape desired in the finished filter cartridge.

Upon leaving the unheated die 10, the shaped sliver 3 passes over the grooved guide roller 11 and then through the drier 12. The drier may be of conventional type heated by means of steam, electrical coils, lamps, and/or the like. Upon leaving the drier the sliver then passes through a heated compression die 13 wherein the filaments on the periphery of the sliver are caused to set and coalesce, thus forming the smooth sheath about the bundle. As hereinbefore pointed out, the opening in the die 13 may be of any desired size depending upon the amount it is desired to compress the filament bundle or sliver which in turn determines the pore size in the filter cartridge.

The sliver then passes between the grooved drawing rollers 14 and 15 and is directed between the blades of the cutter 16 whereupon it is cut into any desired length. The cut filter cartridges 3a fall into any suitable container 17 or the like. In place of the dies shown in Figure 1 there may be employed grooved rollers such as shown in Figure 2. These rollers may be heated whereupon they would serve as a compression die although they may act as well as an unheated die.

In the case of Vinyon filaments and fibers, the water in the bath 4 may be heated to a temperature in the range of 140° to 230° F. and the heated compression die 13 may be heated to a temperature in the range of 270 to 325° F. in order to obtain the desired results. The purpose of passing the sliver 3 through the heated water bath is to allow the filaments to shink while at the same time heating them to a temperature which causes them to become slightly adhesive thereby adhering to adjacent filaments in the bundle. This sealing or adhering of adjacent filaments longitudinally is further facilitated by the unheated forming die 10 which causes slight pressure on the filament bundle or sliver. It is to be noted that any number of unheated dies and heated dies may be employed depending upon the amount of compactness desired in the final filter cartridge and this in turn will be determined by its ultimate use. For example, when filtering fluids having very fine particles of foreign matter therein, it would be desirable to have a filter cartridge wherein the filaments are very compact thus offering a very small pore size. The size of the filaments in the bundle will also influence the pore size of the finished filter cartridge.

As previously pointed out, the sheath formed by coalescing the filaments on the periphery of the bundle is one of the most important features of the present invention. This sheath is shown clearly in Figure 3 at 3b. This sheath serves to hold the substantially parallel filaments or fibers in such position, and in addition, provides rigidity to the filter cartridge as well as a smooth outer periphery which makes the cartridge readily adaptable to insertion into a recess or holder in a filter casing which may support it, for example, such a recess as shown in Figure 4. There the filter cartridge 3a is inserted into the recess 18 in the ram head 19 normally employed in a filter press, for example, such as the well-known hydraulic presses used in the preparation of alkali cellulose for the production of viscose. Further, the autogenous fiber bonds in the cartridge insure the relationship of the fibers or filaments throughout the use of the cartridge and these bonds are resistant to all types of fluids or filtrates.

In Figure 5, the filter cartridge 3a is readily and easily inserted into the stem 20 of the smoking pipe 21. In the instance of a smoking pipe, it would be desirable to have a filter cartridge in which the pore size was rather small since here it is a gaseous material that is being filtered.

While the present invention has been concerned primarily with a filter cartridge formed entirely of thermoplastic filaments or fibers arranged in substantially parallel relationship, it should be understood that the invention also contemplates the use of a non-thermoplastic fiber or filament with the thermoplastic fibers. For example, filaments formed from glass may be employed as well as filaments or yarns of asbestos and like material which would be resistant to the particular fluid that is desired to be filtered. In such instances where filaments formed from two or more different materials are employed, the proportions of thermoplastic filaments may be varied from 5 to 100% of the entire content, with 25 to 100% being preferred.

It is to be understood that the sliver 3 may be of any desired size and it in turn will determine to a certain extent the ultimate size of the filter cartridge to be produced.

Various advantages of the present invention have already been pointed out but suffice it to say the present invention presents a simple and easy means of preparing a filter cartridge in which the filaments therein are in substantially parallel relationship and are held in such position without the use of adhesives and without the use of a separate sheath or retaining means being placed therabout. In addition, the filter cartridges of the present invention may be employed in many instances where presently known filter cartridges cannot be employed due to the fact that they are made of materials which are not resistant to the fluids to be filtered. For example, the filter cartridges of the present invention are particularly suited for filtration of steeping press liquor, or caustic alkali, such as employed in the production of alkali cellulose. Also, the cartridges of the present invention may be employed as wicks for applying lubricants, such as oil, and the like, to bearings, shafts, etc. In this instance, however, it would be preferred to have wool filaments or fibers, and the like, mixed with the Vinyon and the wick would be of a longer length than, for example, a filter cartridge for a smoking pipe. Numerous other advantages of the present invention will be apparent to those skilled in the art.

It is to be understood that changes and variations may be made without departing from the spirit and scope of the invention as defined in the appended claim.

I claim:

A self-supporting filter cartridge comprising a core of thermoplastic aligned filaments arranged in substantially parallel relationship, said core filaments being coalesced to each other at spaced intervals along their length, and a relatively thin annular sheath around the core filaments formed of thermoplastic aligned filaments arranged in substantially parallel relationship, said sheath filaments being coalesced to each other throughout their entire length and coalesced to the outer layer of core filaments at spaced intervals thereby forming a smooth, unitary, relatively rigid cartridge.

References Cited in the file of this patent

UNITED STATES PATENTS

| Number | Name | Date |
| --- | --- | --- |
| 1,585,919 | Irving | May 25, 1926 |
| 2,328,302 | Simison | Aug. 31, 1943 |
| 2,355,822 | Rugeley | Aug. 15, 1944 |
| 2,407,484 | Ehrhardt | Sept. 10, 1946 |
| 2,521,985 | Lang et al. | Sept. 12, 1950 |

FOREIGN PATENTS

| Number | Country | Date |
| --- | --- | --- |
| 588,079 | Great Britain | May 13, 1947 |
| 926,006 | France | Apr. 14, 1947 |